US012644553B2

(12) United States Patent
Hibbard et al.

(10) Patent No.: US 12,644,553 B2
(45) Date of Patent: Jun. 2, 2026

(54) METHOD FOR REMOTE PLACEMENT OF UNDERWATER ISOLATION BARRIERS

(71) Applicants:Brad Hibbard, Auburn Hills, MI (US); Jay Hibbard, Auburn Hills, MI (US); James L. Hibbard, Auburn Hills, MI (US)

(72) Inventors: Brad Hibbard, Auburn Hills, MI (US); Jay Hibbard, Auburn Hills, MI (US); James L. Hibbard, Auburn Hills, MI (US)

( * ) Notice: Subject to any disclaimer, the term of this patent is extended or adjusted under 35 U.S.C. 154(b) by 0 days.

(21) Appl. No.: 19/243,212

(22) Filed: Jun. 19, 2025

(65) Prior Publication Data

US 2025/0314342 A1     Oct. 9, 2025

Related U.S. Application Data

(63) Continuation-in-part of application No. PCT/US2023/085319, filed on Dec. 21, 2023.
(Continued)

(51) Int. Cl.
F16L 55/134          (2006.01)
F16L 55/128          (2006.01)
(Continued)

(52) U.S. Cl.
CPC ......... F16L 55/134 (2013.01); F16L 55/1283 (2013.01); F16L 55/18 (2013.01);
(Continued)

(58) Field of Classification Search
CPC ............................ F16L 55/1283; F16L 55/134
See application file for complete search history.

(56) References Cited

U.S. PATENT DOCUMENTS 4,484,838 A * 11/1984 Stevens ............... E02B 17/0026
                                                                405/211
5,040,922 A * 8/1991 Himmler ............... F16L 55/179
                                                                405/184.2
(Continued)

FOREIGN PATENT DOCUMENTS

CA          2650104 A1 * 7/2009 ............ F16L 55/132
CN     105020538 A * 11/2015 .............. F16L 55/48
(Continued)

OTHER PUBLICATIONS

Int'l Search Report for PCT/US2023/085319, dated Apr. 25, 2024.

*Primary Examiner* — Kenneth Rinehart
*Assistant Examiner* — Richard K. Durden
(74) *Attorney, Agent, or Firm* — MaxGoLaw PLLC

(57)          ABSTRACT

A method of placing an isolation barrier within a conduit filled with fluid includes transporting an isolation barrier to an installation location within a conduit using a Remotely Operated vehicle (ROV) suspended in the fluid and positioning the isolation barrier at the installation location using the ROV. Transporting optionally includes coupling a manipulator device of the ROV to the isolation barrier. Positioning optionally includes aligning the isolation barrier with the installation location using a manipulator device of the ROV and/or using sensors positioned on the ROV or isolation barrier to determine the position of the isolation barrier relative to the installation location. The method additionally optionally includes deploying the isolation barrier at the installation location using the ROV and ROV exiting the conduit after the isolation barrier has been positioned at the installation location. The method additionally optionally includes the ROV monitoring a status of the inflation barrier.

12 Claims, 6 Drawing Sheets

Related U.S. Application Data

(60) Provisional application No. 63/434,162, filed on Dec. 21, 2022.

(51) Int. Cl.
| | | |
|---|---|---|
| *F16L 55/18* | (2006.01) | |
| *F16L 55/28* | (2006.01) | |
| *B63G 8/00* | (2006.01) | |

(52) U.S. Cl.
CPC .. *B63G 2008/005* (2013.01); *B63G 2008/007* (2013.01); *F16L 55/28* (2013.01)

(56) References Cited

U.S. PATENT DOCUMENTS

| | | | | |
|---|---|---|---|---|
| 5,746,543 A * | 5/1998 | Leonard | ............. | B63C 11/2245 |
| | | | | 441/96 |
| 5,924,454 A * | 7/1999 | Dyck | ...................... | F16L 55/28 |
| | | | | 138/90 |
| 6,068,427 A * | 5/2000 | Østergaard | ............ | E21B 33/035 |
| | | | | 405/188 |
| 6,772,705 B2 * | 8/2004 | Leonard | ................... | B63G 8/24 |
| | | | | 114/333 |
| 6,796,463 B2 * | 9/2004 | Boal, Jr. | ............. | B67D 7/0244 |
| | | | | 138/93 |
| 7,720,570 B2 * | 5/2010 | Close | .................... | B25J 9/1617 |
| | | | | 405/184.2 |
| 2011/0240303 A1 * | 10/2011 | Hallundbaek | .......... | B63G 8/001 |
| | | | | 166/339 |
| 2012/0215348 A1 * | 8/2012 | Skrinde | ................... | B25J 9/163 |
| | | | | 701/2 |
| 2014/0020782 A1 * | 1/2014 | Early | ................... | F16L 55/136 |
| | | | | 138/89 |
| 2019/0072223 A1 | 3/2019 | Acker et al. | | |
| 2019/0331282 A1 * | 10/2019 | Lundman | ............ | F16L 55/136 |
| 2021/0285591 A1 * | 9/2021 | Marvi | .................. | B60F 3/0061 |

FOREIGN PATENT DOCUMENTS

| | | | | | |
|---|---|---|---|---|---|
| CN | 110206961 | A | * | 9/2019 | ............ F16L 55/134 |
| CN | 111006093 | A | * | 4/2020 | ............. F16L 55/30 |
| CN | 115613680 | A | * | 1/2023 | ............. E03F 7/106 |
| FR | 2856188 | A1 | * | 12/2004 | ............ F16L 55/128 |
| GB | 2147682 | A | * | 5/1985 | ............. F16L 55/18 |
| GB | 2227805 | A | * | 8/1990 | ............. F16L 55/44 |
| KR | 200369219 | Y | | 12/2004 | |
| KR | 100821648 | B1 | * | 4/2008 | ......... F16L 55/1654 |
| KR | 101355808 | B1 | * | 1/2014 | ......... F16L 55/1645 |
| KR | 20190115199 | A | | 10/2019 | |
| KR | 102311977 | B1 | * | 10/2021 | ............. F16L 55/26 |
| WO | 2005028942 | A1 | | 3/2005 | |

* cited by examiner

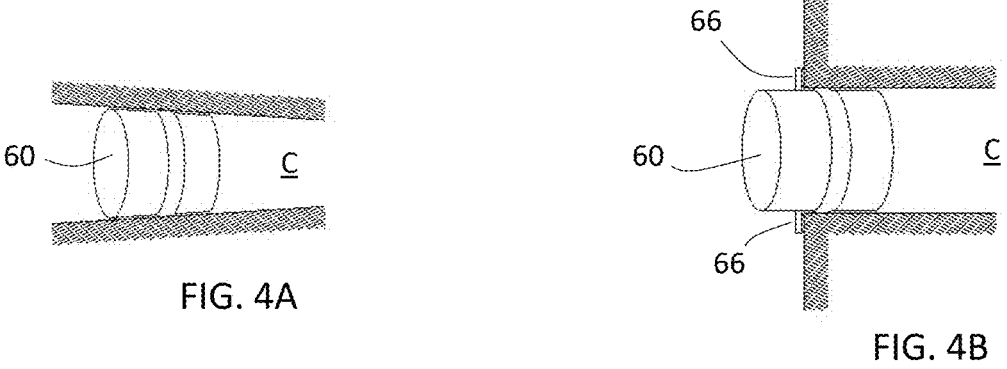
FIG. 4A
FIG. 4B
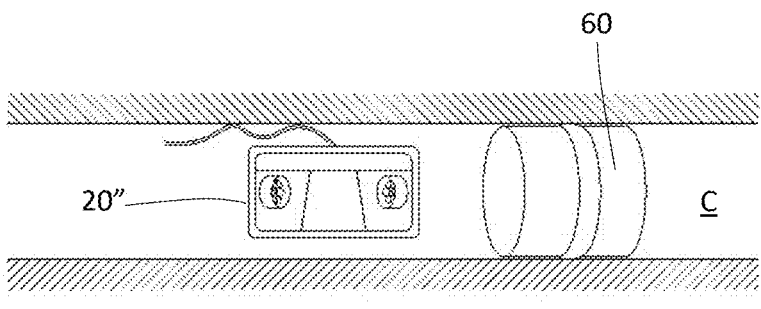
FIG. 4C

METHOD FOR REMOTE PLACEMENT OF UNDERWATER ISOLATION BARRIERS

RELATED APPLICATIONS

This application is a continuation-in-part ("bypass") of PCT Application Serial Number PCT/US2023/85319, filed 21 Dec. 2023, that in turn claims priority benefit of U.S. Provisional Application Ser. No. 63/434,162, filed 21 Dec. 2022, the contents of which are hereby incorporated by reference.

FIELD OF THE INVENTION

The present invention relates to underwater isolation barriers, and more particularly to a method of using such a Remotely Operated Vehicle (ROV) for installation and removal of such underwater isolation barriers.

BACKGROUND OF THE INVENTION

Many structures in a variety of modern industries include piping or tunneling systems that are designed to contain liquids. Such structures include, for example, hydro-electric power plants, aqueducts, power plant cooling tunnels, water conveyance tunnels, to name a few. Conventional maintenance or construction of such structures often includes shutting down operations of the structure and draining all of the water out of the structure in order to allow access to normally submerged portions in need of maintenance. In some situations, isolation barriers can be installed in such piping or tunneling systems to block off and therefore shut down only portions of a system. An isolation barrier is a temporary blockage that can be installed to maintain water in part of a structure while a different part can be dry or at a different pressure. After use, the barrier can be removed. Isolation barriers can also be permanently installed. Installation of isolation barriers can be a dangerous and expensive undertaking given that such procedures require skilled dive teams to place and remove the isolation barriers. However, some locations may be too hazardous or inaccessible for personnel such as divers to access safely, thereby making those locations unsuited for installation of isolation barriers.

Thus, there exists a need for a method for remote installation, use, and/or removal of isolation barriers/bulkheads/plugs that may be temporary or permanent and used in underwater or potentially underwater environments.

SUMMARY OF THE INVENTION

The present invention provides a method of placing an isolation barrier within a conduit filled with fluid. The method includes transporting an isolation barrier to an installation location within a conduit using a Remotely Operated vehicle (ROV) suspended in the fluid and positioning the isolation barrier at the installation location within the conduit using the ROV. Transporting the isolation barrier using the ROV optionally includes coupling a manipulator device of the ROV to the isolation barrier. Positioning the isolation barrier using the ROV optionally includes aligning the isolation barrier with the installation location within the conduit using a manipulator device of the ROV and/or using a plurality of sensor positioned on at least one of the ROV and the isolation barrier to determine the position of the isolation barrier relative to the installation location within the conduit. The method additionally optionally includes deploying the isolation barrier at the installation location within the conduit using the ROV and ROV exiting the conduit after the isolation barrier has been positioned at the installation location within the conduit. The method additionally optionally includes the ROV monitoring a status of the inflation barrier, including inflation status, location status, power status, sealed status within the conduit, or a combination thereof.

BRIEF DESCRIPTION OF THE DRAWINGS

The present invention is further detailed with respect to the following figures that depict various aspects of the present invention.

FIG. 4A is a side view of an isolation barrier installed within a tapered conduit according to embodiments of the present invention;

FIG. 4B is a side view of an isolation barrier installed within a T-shaped conduit and having restraint feet according to embodiments of the present invention; and FIG. 4C is a side view of an isolation barrier installed within a parallel conduit according to embodiments of the present invention.

DESCRIPTION OF THE INVENTION

Figures 1A, 1B, 1C:
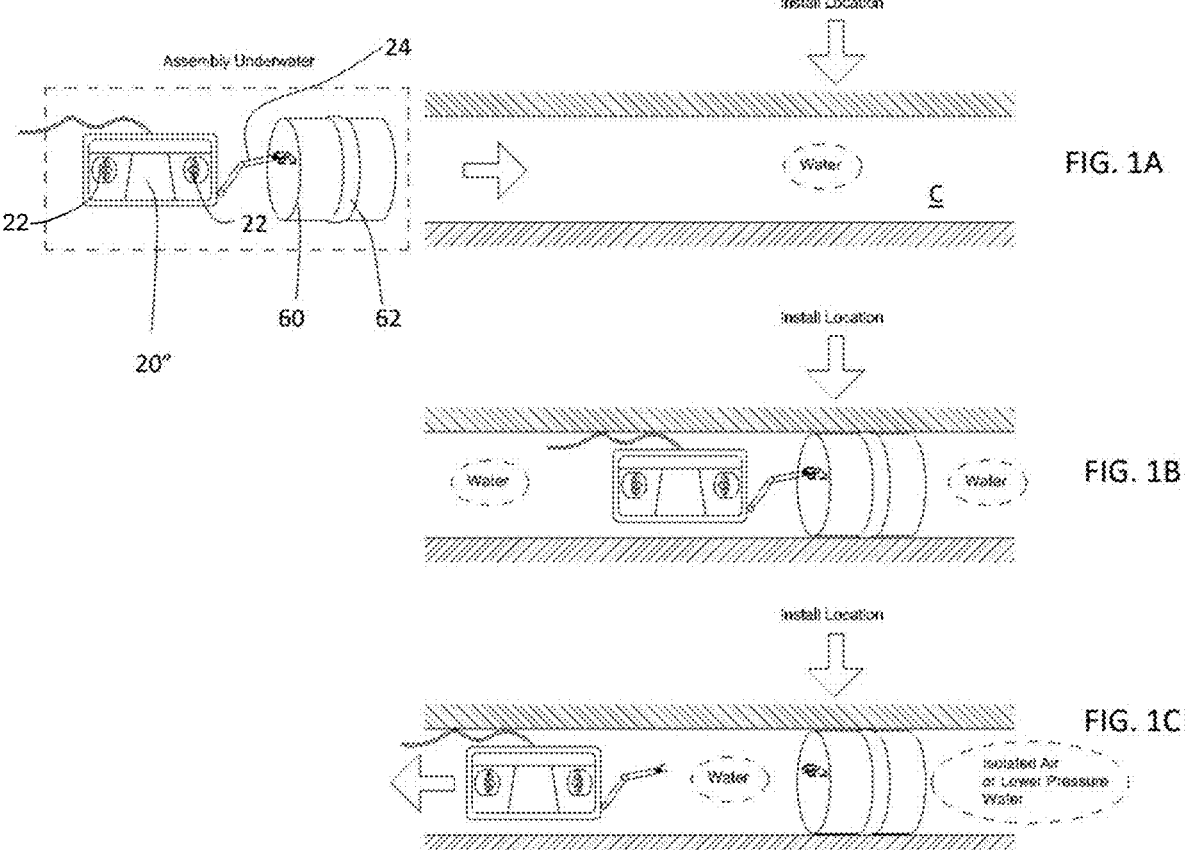
FIG. 1A is a schematic drawing of an ROV transporting an isolation barrier to an installation location within a water filled conduit according to embodiments of the present invention.
FIG. 1B is a schematic drawing of an ROV positioning and deploying an isolation barrier within a water filled conduit according to embodiments of the present invention.
FIG. 1C is a schematic drawing of an ROV disconnecting from an installed isolation barrier within a water filled conduit according to embodiments of the present invention.

The present invention has utility as a method of using an Remotely Operated Vehicle (ROV) for installation, use, and/or removal of isolation barriers/bulkheads/plugs that may be temporary or permanent and used in underwater or potentially underwater environments, particularly in areas inaccessible or too hazardous for personnel to access.

The present invention will now be described with reference to the following embodiments. As is apparent by these descriptions, this invention can be embodied in different forms and should not be construed as limited to the embodiments set forth herein. Rather, these embodiments are provided so that this disclosure will be thorough and complete, and will fully convey the scope of the invention to those skilled in the art. For example, features illustrated with respect to one embodiment can be incorporated into other embodiments, and features illustrated with respect to a particular embodiment may be deleted from the embodiment. In addition, numerous variations and additions to the embodiments suggested herein will be apparent to those skilled in the art in light of the instant disclosure, which do not depart from the instant invention. Hence, the following specification is intended to illustrate some particular embodiments of the invention, and not to exhaustively specify all permutations, combinations, and variations thereof.

It is to be understood that in instances where a range of values are provided that the range is intended to encompass not only the end point values of the range but also intermediate values of the range as explicitly being included within the range and varying by the last significant figure of the range. By way of example, a recited range of from 1 to 4 is intended to include 1-2, 1-3, 2-4, 3-4, and 1-4.

Unless otherwise defined, all technical and scientific terms used herein have the same meaning as commonly understood by one of ordinary skill in the art to which this invention belongs. The terminology used in the description of the invention herein is for the purpose of describing particular embodiments only and is not intended to be limiting of the invention.

Unless indicated otherwise, explicitly or by context, the following terms are used herein as set forth below.

As used in the description of the invention and the appended claims, the singular forms "a," "an" and "the" are intended to include the plural forms as well, unless the context clearly indicates otherwise.

As used herein, "and/or" refers to and encompasses any and all possible combinations of one or more of the associated listed items, as well as the lack of combinations when interpreted in the alternative ("or").

As used herein, Remotely Operated Vehicle (ROV) is intended to also encompass an Autonomous Underwater Vehicle (AUV), Unmanned Underwater Vehicle, (UUV), submersible or manned submersible as the terms are conventionally used in the field.

According to some inventive embodiments, a method is provided to install and/or remove barriers, bulkheads, and/or plugs that may be temporary or permanent and used in underwater or potentially underwater environments using an ROV. Conventional maintenance or construction of underwater structures such as hydro-electric power plants or tunnels can require draining all of the water out of the structure. Similarly, aqueducts, power plant cooling tunnels, water conveyance tunnels, and the structures connected to tunnels occasionally require a temporary isolation barrier to be installed to maintain water in part of a structure while a different part can be dry or at a different pressure. After use, the barrier can be removed. Isolation barriers can also be permanently installed. Some such isolation barriers may be required in a hazardous or inaccessible location in which personnel such as divers cannot access or access safely. Accordingly, some inventive embodiments of the present invention provide for the robotic installation, use, and/or removal of isolation barriers in order to install and remove isolation barriers in areas inaccessible or to hazardous for personnel to access. This is advantageous in that robotic installation or removal of such isolation barriers enables installation and removal of such barriers in areas inaccessible or too hazardous for personnel to access while also enabling small portions of a underwater system, such as a tunnel in a hydro-electric power plant, to be dewatered for maintenance without requiring removal of the water out of the entire structure, thereby reducing the amount of time that the equipment is out of service.

According to some inventive embodiments, as shown in FIG. 1A, an ROV 20" is configured to transport an isolation barrier 60 from water surface and through a water filled conduit C into a desired installation location, for example near a power generator turbine of a hydro-electric power plant. According to embodiments the ROV 20" includes a propulsion device 22, which according to embodiments are wheels or at least one propeller, as shown in FIGS. 1A-3B and 4C. According to some inventive embodiments, the ROV 20" includes a manipulator device 24 that is configured to interact with the barrier 60 in order to transport, position, install, and remove the barrier 60. According to some inventive embodiments, the manipulator device 24 of the ROV 20" is at least one of an arm, a latch, a temporary fluid connection, a temporary electrical connection, or non-contact power or data connections as described above. The ROV 20" then undertakes an operation to place the isolation barrier within the waterfilled conduit to secure the barrier 60 in place and seal the barrier 60 to the conduit using for example a seal 62 provided on the barrier 60. According to some embodiments, the barrier 60 is inflatable and the operation of the ROV 20" includes inflating the barrier 60 using the manipulator device 24 of the ROV 20" that includes an inflation port, as such the AUC 20" is configured to change the buoyancy of the barrier 60 while it is submerged underwater. According to embodiments, the barrier 60 is inflated with air or with water. Next, as shown in FIG. 1C, the method includes the ROV 20" disconnecting itself from the barrier 60 and exiting the conduit C in the direction from which it came, at which point the conduit on one side of the barrier 60 may be drained of water or the pressure therein may be otherwise modified so that necessary repairs or inspections may be undertaken. When the isolation barrier is no longer required, such as when the repairs or inspections are completed, the ROV 20" then undertakes a retrieval operation to uninstall the isolation barrier and transport back through the conduit and ultimately to the water surface. A retrieval operation is the reverse of the installation operation, with the ROV 20" entering the conduit, connecting its manipulator device 24 to the installed barrier 60, deflating the barrier 60, and then removing the barrier 60 from the conduit.

Figure 3A:
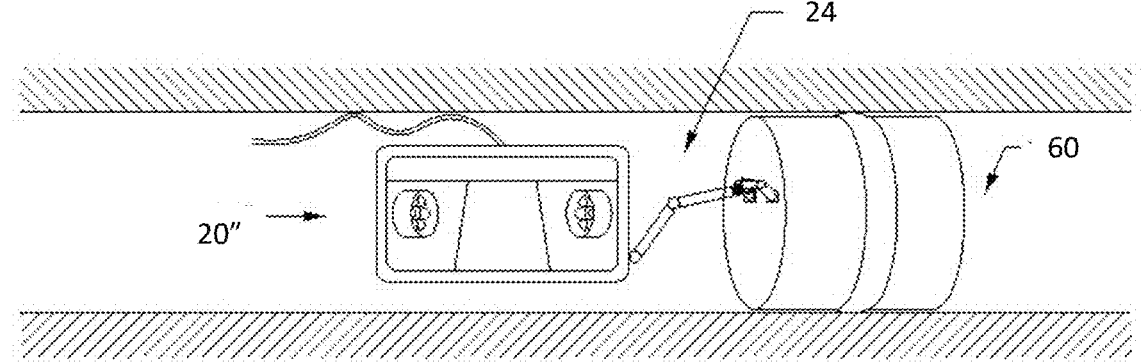
FIG. 3A is a side view of an ROV and isolation barrier connected via an arm of the ROV according to embodiments of the present invention.
Figure 3B:
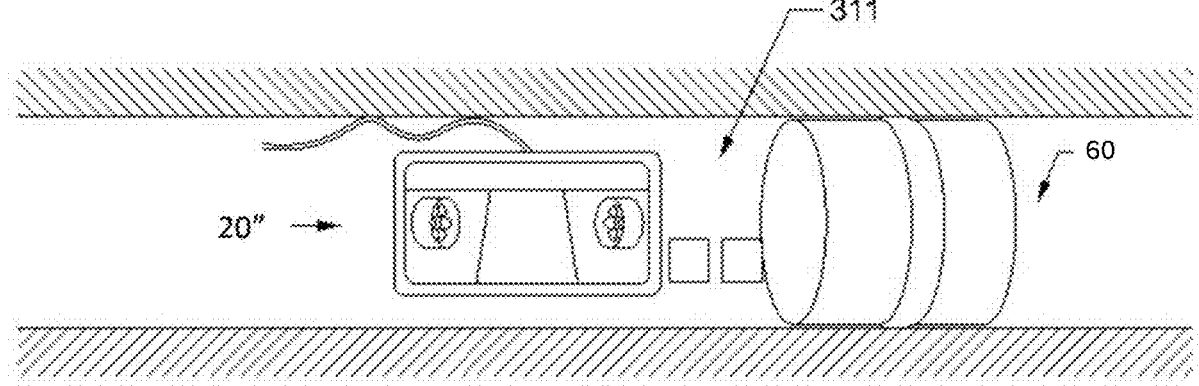
FIG. 3B is a side view of an ROV and isolation barrier connected via a non-contact data and power connection according to embodiments of the present invention.
Figure 3C:
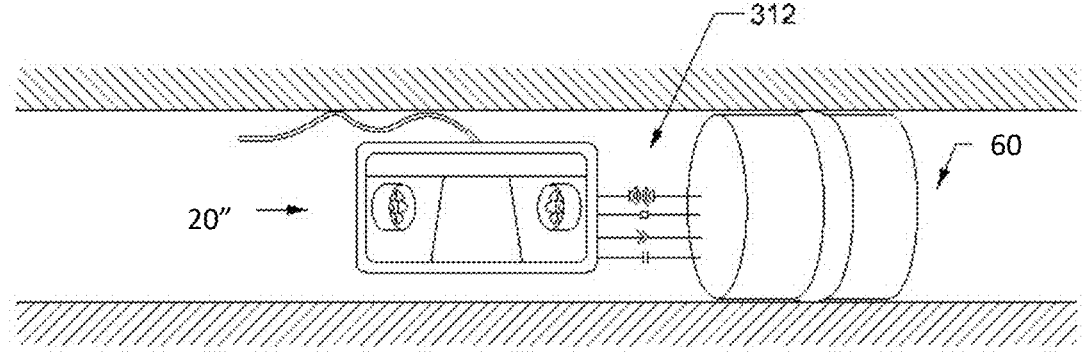
FIG. 3C is a side view of an ROV and isolation barrier connected via a wired data and power connection according to embodiments of the present invention.

In such embodiments, the ROV 20" is configured to provide power and controls functionality to the barrier 60 during any of the transport, placement, installation, and removal steps via the manipulator device 24, as shown in FIG. 3A, or latching device 311, as shown in in FIG. 3B, or via a non-contact or direct contact power or data connection 312, as shown in FIG. 3C, or via a temporary or permanent wired electric and data connection 312, as shown in FIG. 3C. Additionally, the ROV 20" is also configured to monitor the status of the barrier 60. For example, the ROV 20" when electrically or data connected to the barrier 60 may receive information from the barrier 60 regarding the inflation status, location status, power status, sealed status within a conduit, and the like.

According to some inventive embodiments, the ROV 20" is outfitted with a plurality of sensors such as sonar sensors, optical sensors, proximity sensors, and the like so the ROV 20" is able to monitor the barrier 60 status and the surroundings during transport, positioning, installation, and removal of the barrier 60. For example, the ROV 20" may be outfitted with sonar sensors so that the ROV 20" is able to undertake a barrier 60 installation or removal even in water conditions with limited to no visibility.

Figures 2A, 2B, 2C:
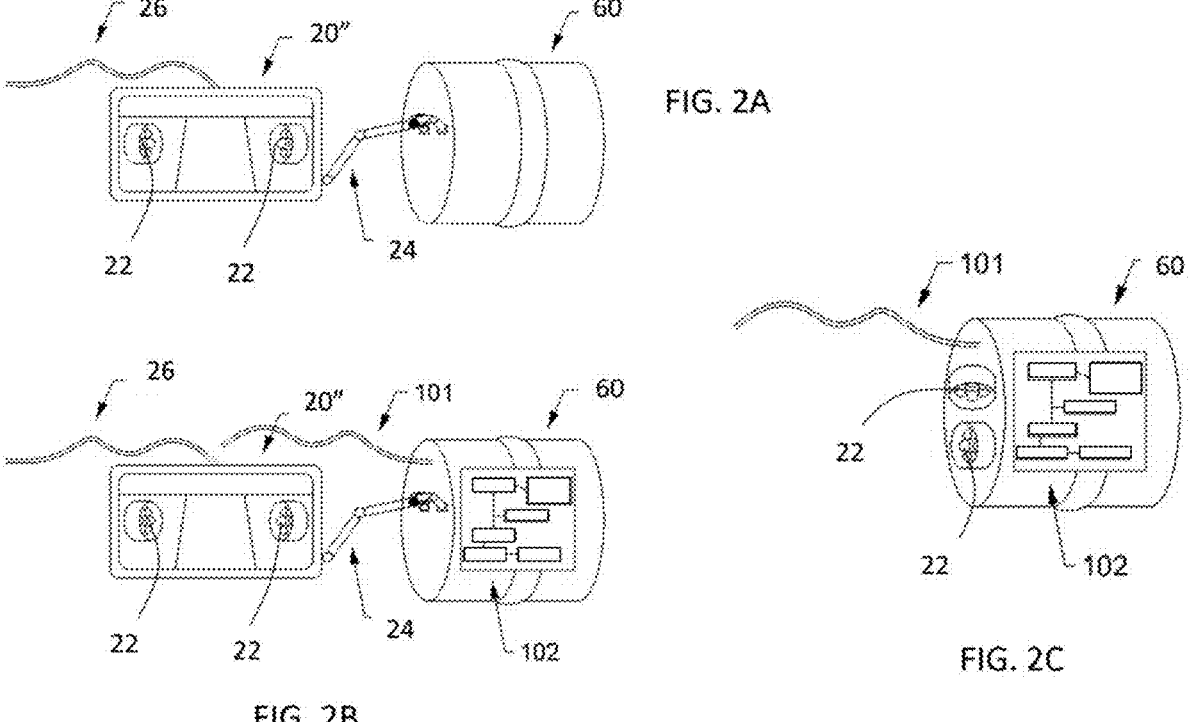
FIG. 2A is a side view of a non-automated isolation barrier and an ROV according to embodiments of the present invention.
FIG. 2B is a side view of a partially automated isolation barrier and ROV according to embodiments of the present invention.
FIG. 2C is a side view of a fully automated isolation barrier and ROV hybrid according to embodiments of the present invention.

According to some inventive embodiments, the ROV 20" and the barrier are distinct and separate elements that are configured to couple together and decouple using the manipulator device 24, as shown in FIG. 2A or mechanical attachment such as a latch device 311, as shown in FIG. 3B. As shown in FIG. 2A, the barrier 60 is a dumb barrier 60 with no onboard electronics. According to some inventive embodiments, the barrier 60 has power and control separate from the ROV and supplied via a power cable 101. According to some inventive embodiments, the barrier 60 is outfitted with onboard electronics 102, which may also include its own electronic and data connection cable 101, as shown in FIG. 2B. In FIG. 2B, a partially powered or controlled from surface bulkhead is depicted. As described above, the ROV 20" moves into proximity of the location at with the barrier 60 is to be installed, and then deploys the barrier 60 there from within the conduit. The ROV 20" may then be configured to detach itself from the barrier 60 or alternatively may stay with the barrier 60 until the barrier 60 is ready to be removed from the conduit. According to some embodiments, such as shown in FIG. 2C, the isolation barrier 60 is fully self-deploying without ROV 20" and actuates on board electronics 102, self-propels, or self-installs. In this case, a power and communications cable 101 is connected from an operator station through the water to the isolation barrier 60. According to embodiments, the isolation barrier with its built-in electronics contains its own actuators and propulsion to self-install within the conduit.

According to some inventive embodiments, the above-described method for placing a barrier 60 includes placing the barrier 60 in a tapered conduit C, as shown in FIG. 4A. According to some inventive embodiments, the barrier 60 is outfitted with a plurality of restraint feet 66 that are configured to additionally physically anchor the barrier 60 within the conduit C, particularly a T-shaped conduit as shown. It is appreciated that this embodiment is also operative with cylindrical pipe installation as detailed with respect to FIG. 4C.

It should be appreciated that components of the various embodiments detailed herein are operative in intermixed combinations and still remain within the scope of the invention.

Patent documents and publications mentioned in the specification are indicative of the levels of those skilled in the art to which the invention pertains. These documents and publications are incorporated herein by reference to the same extent as if each individual document or publication was specifically and individually incorporated herein by reference.

The foregoing description is illustrative of particular embodiments of the invention but is not meant to be a limitation upon the practice thereof. The following claims, including all equivalents thereof, are intended to define the scope of the invention.

The invention claimed is:

1. A method of placing an isolation barrier within a conduit filled with fluid, the method comprising:
   transporting an isolation barrier inflated with air through the conduit filled with fluid to an installation location within the conduit using a Remotely Operated vehicle (ROV) suspended in the fluid; and
   positioning the isolation barrier at the installation location within the conduit using the ROV; and
   deploying the isolation barrier using the ROV to secure and seal the isolation barrier at the installation location by changing the buoyancy of the isolation barrier while it is submerged in the conduit filled with fluid.

2. The method of claim 1 wherein transporting the isolation barrier using the ROV includes coupling a manipulator device of the ROV to the isolation barrier.

3. The method of claim 2 wherein the manipulator device of the ROV is at least one of an arm, a latch, a temporary fluid connection, a temporary electrical connection, or non-contact power or data connections.

4. The method of claim 1 wherein positioning the isolation barrier using the ROV includes aligning the isolation barrier with the installation location within the conduit using a manipulator device of the ROV.

5. The method of claim 1 wherein positioning the isolation barrier using the ROV includes using a plurality of sensors positioned on at least one of the ROV and the isolation barrier to determine the position of the isolation barrier relative to the installation location within the conduit.

6. The method of claim 1 wherein deploying the isolation barrier using the ROV includes inflating the isolation barrier using a manipulator device of the ROV.

7. The method of claim 1 wherein deploying the isolation barrier using the ROV includes decoupling the ROV from the isolation barrier.

8. The method of claim 1 wherein the fluid within the conduit is water prior to installation of the isolation barrier.

9. The method of claim 1 wherein the ROV includes a propulsion device configured to propel the ROV within the conduit.

10. The method of claim 1 further comprising the ROV exiting the conduit after the isolation barrier has been positioned at the installation location within the conduit.

11. The method of claim 1 wherein the ROV is configured to monitor a status of the isolation barrier.

12. The method of claim 11 wherein the status of the isolation barrier includes inflation status, location status, power status, sealed status within the conduit, or a combination thereof.

* * * * *